(12) United States Patent
Kamble

(10) Patent No.: US 11,084,987 B2
(45) Date of Patent: Aug. 10, 2021

(54) DEMULSIFIERS FOR SEPARATION OF WATER FROM OIL AND PREPARATION THEREOF

(71) Applicants: Council of Scientific and Industrial Research, New Delhi (IN); Oil and Natural Gas Corporation Ltd., New Delhi (IN)

(72) Inventor: Sanjay Pandurang Kamble, Pune (IN)

(73) Assignees: Council of Scientific and Industrial Research, New Delhi (IN); Oil and Natural Gas Corporation Ltd., New Delhi (IN)

( * ) Notice: Subject to any disclaimer, the term of this patent is extended or adjusted under 35 U.S.C. 154(b) by 0 days.

(21) Appl. No.: 15/529,406

(22) PCT Filed: Nov. 26, 2015

(86) PCT No.: PCT/IN2015/050176
§ 371 (c)(1),
(2) Date: May 24, 2017

(87) PCT Pub. No.: WO2016/084104
PCT Pub. Date: Jun. 2, 2016

(65) Prior Publication Data
US 2017/0327753 A1    Nov. 16, 2017

(30) Foreign Application Priority Data

Nov. 27, 2014    (IN) .......................... 3437/DEL/2014

(51) Int. Cl.
*B01D 17/05*    (2006.01)
*C10G 33/04*    (2006.01)
(Continued)

(52) U.S. Cl.
CPC ............ *C10G 33/04* (2013.01); *C08F 212/08* (2013.01); *C08F 220/06* (2013.01); *C08F 226/06* (2013.01)

(58) Field of Classification Search
CPC ...... B01D 17/04; B01D 17/047; C10G 33/04; C08F 226/06; C08F 212/08; C08F 220/06
(Continued)

(56) References Cited

U.S. PATENT DOCUMENTS 3,802,917 A * 4/1974 Treat .................... B01D 17/042
                                                134/10
4,417,976 A * 11/1983 Sander .................. B01D 17/00
                                                208/13
(Continued)

FOREIGN PATENT DOCUMENTS

JP    2005041992    2/2005
JP    2012131870    7/2012

OTHER PUBLICATIONS

Miguel Rondon et al., Breaking of Water-in-Crude Oil Emulsions. 1. Physicochemical Phenomenology of Demulsifier Action, Energy & Fuels 2006, 20, 1600-1604. (Year: 2006).*

*Primary Examiner* — Michael A Salvitti
(74) *Attorney, Agent, or Firm* — Carmody Torrance Sandak & Hennessey LLP

(57) ABSTRACT

The present invention relates to novel crude oil demulsifier comprises a copolymer of styrene with pyridine or a carboxylic acid or its salt selected from methacrylic, acrylic, maleic or fumaric acid with molecular weight in the range of 10000 to 600000 Daltons, dose in the range of 20-1000 ppm. The invention further relates to a process for demulsification of crude oil by treating crude oil with the copolymer in the range of 20-1000 ppm in the temperature range of 25-40° C.

(Continued)

by shaking to obtain demulsified crude oil having crude oil with <1% water, and Water <100 ppm oil.

7 Claims, 5 Drawing Sheets

(51) Int. Cl.
*C08F 212/08* (2006.01)
*C08F 220/06* (2006.01)
*C08F 226/06* (2006.01)

(58) Field of Classification Search
USPC .......................................... 516/162, 180, 190
See application file for complete search history.

(56) References Cited

U.S. PATENT DOCUMENTS

| | | | | |
|---|---|---|---|---|
| 5,028,239 A | * | 7/1991 | Stephenson | C10G 33/04 208/188 |
| 5,100,582 A | * | 3/1992 | Bhattacharyya | B01D 17/047 516/186 |
| 5,472,617 A | * | 12/1995 | Barthold | C08G 65/2609 210/708 |
| 7,470,744 B2 | | 12/2008 | Behles | |
| 2002/0075369 A1 | * | 6/2002 | Ota | C09B 7/0002 347/100 |
| 2005/0194292 A1 | * | 9/2005 | Beetge | C10G 1/047 208/391 |
| 2012/0043258 A1 | * | 2/2012 | Schaefer | B01D 17/047 208/188 |
| 2013/0253137 A1 | * | 9/2013 | Clapper | C08F 2/38 525/66 |
| 2016/0326443 A1 | * | 11/2016 | Young | B01D 17/047 |
| 2017/0327753 A1 | * | 11/2017 | Kamble | C08F 212/08 |

* cited by examiner

DEMULSIFIERS FOR SEPARATION OF WATER FROM OIL AND PREPARATION THEREOF

FIELD OF THE INVENTION

The present invention relates to novel demulsifiers for separation of water from oil and preparation thereof. Further, it relates to a process for the separation of water from simulated as well as actual crude oil using novel demulsifiers.

BACKGROUND AND PRIOR ART

Petroleum oil is today's most valuable commodity. It is the best source of fuel, tar, waxes, metallurgical coke and chemical precursors for most of the organic chemical industry. Crudely put, petroleum oil is product of fossilized organisms subjected to the tremendous pressure under layers of Earth's crust. Naturally, it takes a few million years for fossils to convert to a petroleum reservoir. Many of such reservoirs are formed under the sea. Those which are not are believed to be once part of the sea. Thus, most reservoirs have a bed of mineral salt nearby. Organisms that are now fossilized have their organic matter converted into petroleum and minerals are incorporated into salt deposits. Common method for harvesting these oil fields is to drill to the reservoir and utilize the pressure by the petroleum gases that are built up and extract the oil underneath. If such pressure is insufficient, artificial driving force is provided with pressurized water. This results into better rate of production of the oil.

Oil produced from the well contains water in an emulsion form. Most of the time, oil is in continuous phase and water in the dispersed phase. This emulsion cannot be sent to refineries without separation. Reason being it increases processing cost of oil since water has large latent heat of vaporization. Hence, only solutions to this issue are mechanical and chemical demulsifiers; emulsion breakers that mechanically or through addition of a chemical will allow the phases to separate.

Platforms that operate on offshore oilfields usually cannot afford mechanical demulsifiers. They occupy too much space and hence, chemical demulsifiers are best suited for them. Choice of chemical demulsifier is important. Many factors, most importantly composition of the oil, affects this choice. Resin and asphaltene which are insoluble in heptanes and are usually suspended as colloids enhance stability of the emulsion. Oils with more asphaltene content form more stable emulsions and oils with more resinous content form weaker emulsions.

Chemical demulsification is an economic, convenient and efficient method for breaking water in oil emulsions. The function of the demulsifier is to modify the interfacial properties and displace the asphaltenic stabilized emulsion film from the oil/water interface.

Amphiphilic block copolymers, which contain hydrophilic ethylene oxide (EO) and hydrophobic propylene oxides (PO) blocks, are commercially available and widely used as demulsifiers. The structure of a demulsifier can influence the interfacial properties and cause displacement of the emulsion film. The performance of the demulsifier strongly depends on its chemical characteristics, chemical composition, MW, oil/water interfacial tension etc. However, ethylene oxide (EO) or propylene oxides (PO) are toxic, explosive and deadly carcinogens. Since PFRs require alkoxylation through EO and PO, they are difficult to work on as well.

U.S. Pat. No. 7,470,744 B2 discloses a copolymer useful as a demulsifier or water clarifier may be prepared by polymerizing at least one aromatic monomer having one or more polymerizable double bonds; at least one oleophilic monomer having one or more polymerizable double bonds; at least one ionizable monomer having a polymerizable double bond; and at least one hydrophilic monomer having one or more polymerizable double bonds, under polymerization conditions sufficient to prepare a copolymer.

Therefore, there is need to develop cost effective demulsifier which can work at lower temperature and lower dosages for separation of water from crude oil.

OBJECTIVE OF THE INVENTION

The main object of the present invention is to provide novel simple, efficient and economic different demulsifiers for separation of water from oil.

Another object of the present invention is to provide a process for the preparation of novel demulsifiers.

SUMMARY OF THE INVENTION

Accordingly, the present invention provides novel carboxylic acid-styrene and pyridine-styrene based demulsifiers for separation of water from simulated as well as actual crude oil and process of preparation thereof.

Further, it provides a process for the separation of water from simulated as well as actual crude oil using novel carboxylic acid-styrene and pyridine-styrene based demulsifiers.

In an aspect, the present invention provides a room temperature process for demulsification of crude oil using a copolymer of styrene with pyridine or a carboxylic acid or its salt selected from methacrylic, acrylic, maleic or fumaric acid with molecular weight in the range of 10000 to 600000, dose in the range of 20-1000 ppm, demulsifying in 1-10 minutes to obtain:

a) crude oil with <1% water, and
b) Water <100 ppm oil, said process comprising:

Using 100-200 ml crude with the copolymer in the range of 20-1000 ppm in the temperature range of 25-40° C. by manually shaking for 50 shakes to obtain demulsified crude oil.

In another aspect, the present invention provides a process, wherein co-polymer is selected from co-polymer using styrene and sodium acrylate; co-polymer using styrene and sodium fumarate; or co-polymer using styrene and 4-vinyl pyridine.

In a preferred embodiment, the present invention provides novel carboxylic acid-styrene based demulsifier wherein the carboxylic acid or its salt is preferably selected from methacrylic, acrylic or maleic acid or fumaric acid.

In another preferred embodiment, the present invention provides pyridine-styrene based demulsifier wherein pyridine is preferably 4-vinyl pyridine or 2-vinyl pyridine.

DETAILED DESCRIPTION OF THE INVENTION

Figure 1:
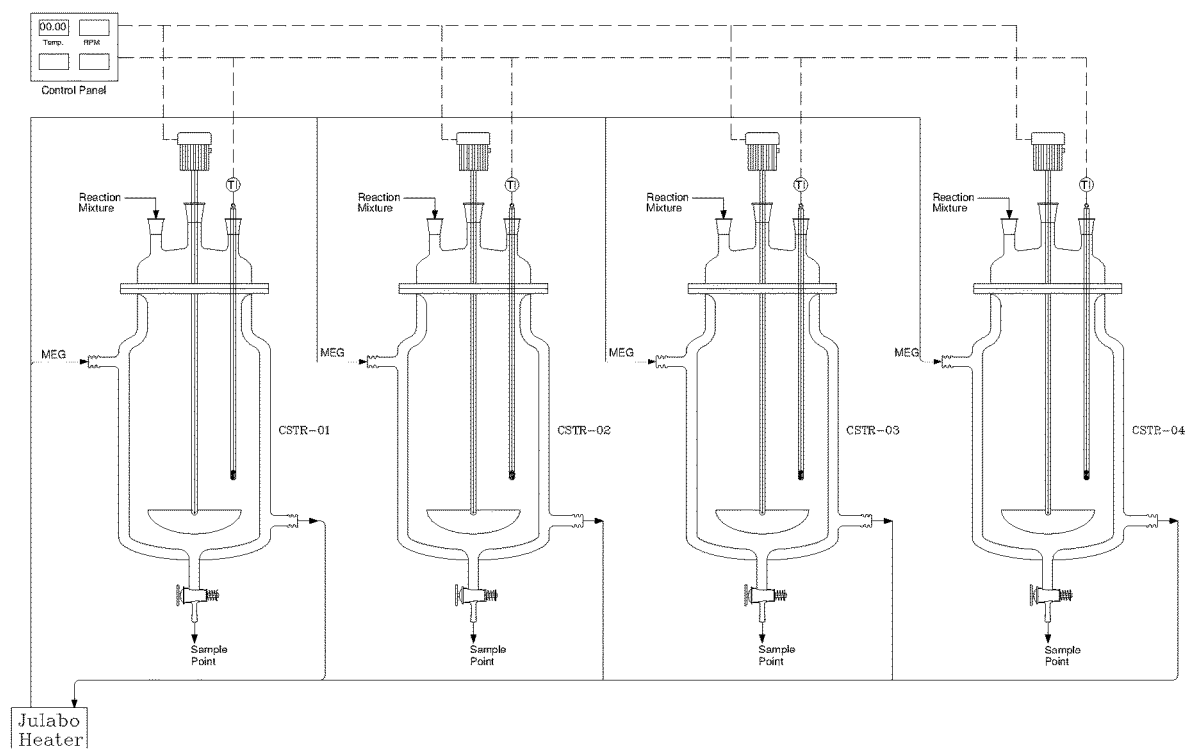
FIG. 1: Experimental setup for preparation of co-polymer by emulsion polymerization.

The invention will now be described in detail in connection with certain preferred and optional embodiments, so that various aspects thereof may be more fully understood and appreciated.

In view of above, the present invention provides novel demulsifiers for separation of water from oil and preparation thereof.

In view of above, the present invention further provides a process for the separation of water from simulated as well as actual crude oil using novel demulsifiers.

In an embodiment, the present invention provides novel carboxylic acid-styrene and pyridine-styrene based demulsifiers.

In a preferred embodiment, the present invention provides novel carboxylic acid-styrene based demulsifier wherein the carboxylic acid or its salt is preferably selected from methacrylic, acrylic or maleic acid or fumaric acid.

In another preferred embodiment, the present invention provides pyridine-styrene based demulsifier wherein pyridine is preferably 4-vinyl pyridine or 2-vinyl pyridine.

In yet another preferred embodiment, the present invention provides novel demulsifiers with molecular weight in the range of 10000 to 600000 Daltons.

In another embodiment, the present invention provides a process for the synthesis of novel carboxylic acids-styrene and pyridine-styrene based demulsifier comprising:
a. Preparing known quantity of surfactant solution by dissolving known quantity of surfactant in de-ionized water followed by stirring and heating to obtain a surfactant solution;
b. Adding the known proportions of mixture of monomers to the surfactant solution of step (a) to obtain an emulsion;
c. Preparing the known concentration of initiators solution in water and adding the redox initiator solution first followed by reductant initiator solution to an emulsion of step (b) to obtain the reaction mixture;
d. Continue the emulsion reaction at particular temperature and reaction time in order to complete polymerization and obtain the resultant reaction emulsion;
e. Precipitating the resultant reaction emulsion of step (d) in appropriate non-solvent followed by drying the precipitated polymer to obtain the dried polymer;
f. The dried polymer of step (e) is crushed into powder and is subsequently used in the preparation of various strength of polymer solution (1-15%) in different solvents like xylene, toluene, cyclohexene, benzene, chloroform etc.

In a preferred embodiment the present invention provides a process for the synthesis of novel demulsifier wherein the surfactant is preferably Tween 80 or polysorbate 80 or Tween 20; one monomer is selected from carboxylic acid or salt of methacrylic acid, acrylic acid, fumaric acid or 4-vinyl pyridine; the other monomer is styrene; ratio of monomer: styrene is in the range of 5:95 to 50:50; redox initiator is preferably ammonium persulphate (APS); reductant initiator is preferably sodium metabisulfite (SMBS); non-solvent used for precipitation is preferably acetone or methanol; solvent used for polymer solution is toluene or xylene or cyclohexene or benzene or chloroform.

In yet another embodiment the present invention provides a low temperature process for demulsification of crude oil using novel demulsifiers as described above, dose in the range of 20-5000 ppm, in 1-20 minutes to obtain
a) Crude oil with <1% water; and
b) Effluent water with <100 ppm oil, In a preferred embodiment the present invention provides a process of demulsification, using novel demulsifiers, wherein the demulsifiers efficiency is >95%.

In an aspect the present invention provides novel demulsifiers selected from co-polymer using styrene and sodium acrylate; co-polymer using styrene and sodium fumarate; co-polymer using styrene and 4-vinyl pyridine.

The following examples, which include preferred embodiments, will serve to illustrate the practice of this invention, it being understood that the particulars shown are by way of example and for purpose of illustrative discussion of preferred embodiments of the invention.

EXAMPLES

Example 1 a) Synthesis of Low Temperature Demulsifier LTD Using Emulsion Polymerization

The various batches for synthesis of low temperature demulsifier i.e. co-polymer are done by varying the percentage of styrene and sodium acrylate (SA), styrene-disodium fumarate and styrene-4-vinyl pyridine from ratio 5:95 to 50:50 percent weight. The reaction composition and conditions are given in Table I, II and III.
1) Preparation of co-polymer using styrene and sodium acrylate (Table: I)
2) Preparation of co-polymer using styrene and sodium fumarate (Table: II)
3) Preparation of co-polymer using styrene and 4-vinyl pyridine (Table: III)

b) Experimental Procedure of Synthesis of Low Temperature Demulsifier (LTD)

The low temperature demulsifier was synthesized in a 1 L stirred reactors connected in parallel. The temperature and speed of agitation was monitored with help of PID controller and speed controller respectively. The experimental setup diagram was shown in FIG. 1. The polymer was prepared by following steps:
i. Initially known quantity of surfactant solution was prepared by dissolving known quantity of surfactant in de-ionized water. Charge the surfactant solution in the stirred reactor and then start stirring. The desired temperature of the reaction was adjusted with the help of Oil-MEG heater.
ii. Once the desired reaction temperature is reached, then known proportions of mixture of monomers is added in the surfactant solution and then wait till an emulsion is formed.
iii. Prepare the known concentration of initiators solution in water. Charge the redox initiator solution first followed by reductant initiator solution. Keep desired time of interval between both the additions of initiators.
iv. Take the reaction samples at regular intervals during the course of reaction to find out whether reaction is completed or not. This can be done by weight loss method.

Continue the emulsion reaction until complete polymerization take place, generally 2 hours is required for reaction.

v. The resultant reaction solution was precipitated in appropriate non-solvent methanol, acetone etc. Then the precipitated polymer was dried in oven at desired temperature. Further the dried polymer is crushed into the powder and subsequently used in the preparation of various strength of polymer solution in solvent like toluene, xylene, toluene, cyclohexene, benzene, chloroform.

c) Experimental Procedure for Demulsification of Crude Oil (Bottle Test)

The water-in-oil separation index test provides a measure of the stability of the crude oil. This crude oil bottle test is a quantitative method for demulsifier testing and involves the following procedure:

a) The crude oil emulsion sample is tested as soon as possible after it is received in the laboratory. Always fresh crude oil sample was used for bottle test because crude oil characteristics changes with respective time. Initially free water present in the crude oil is drained:
b) The initial water content in the crude oil emulsion was estimated as ASTM method;
c) The 100 ml or 200 ml well mixed crude oil sample is taken to 250 ml bottle tubes;
d) The bottle tubes are placed in a water bath for the maintain crude oil desired temperature;
e) The required dosage of the demulsifier is added to the bottle tubes;
f) The tubes are shaken by hand a given number of times (approximately 50 shakes) and placed in the water bath at the desired temperature 40° C. and desired curing time up to 6 minute;
g) Then amount of water separated from crude oil is measured with time (6, 10, 15 and 20 minutes);
h) The water content in the separated crude oil is measured by Dean Stark apparatus method.

Direct comparison of demulsifier dosage obtained in the laboratory bottle test with offshore bottle test should always be made. There is a definite effect of aging. The fresh crude oil gives better result as compared to aged crude oil. Therefore, it is always better to test the developed demulsifier on fresh emulsion samples preferably offshore testing gives real efficiency of demulsifier.

d) Characterization

Figure 2:
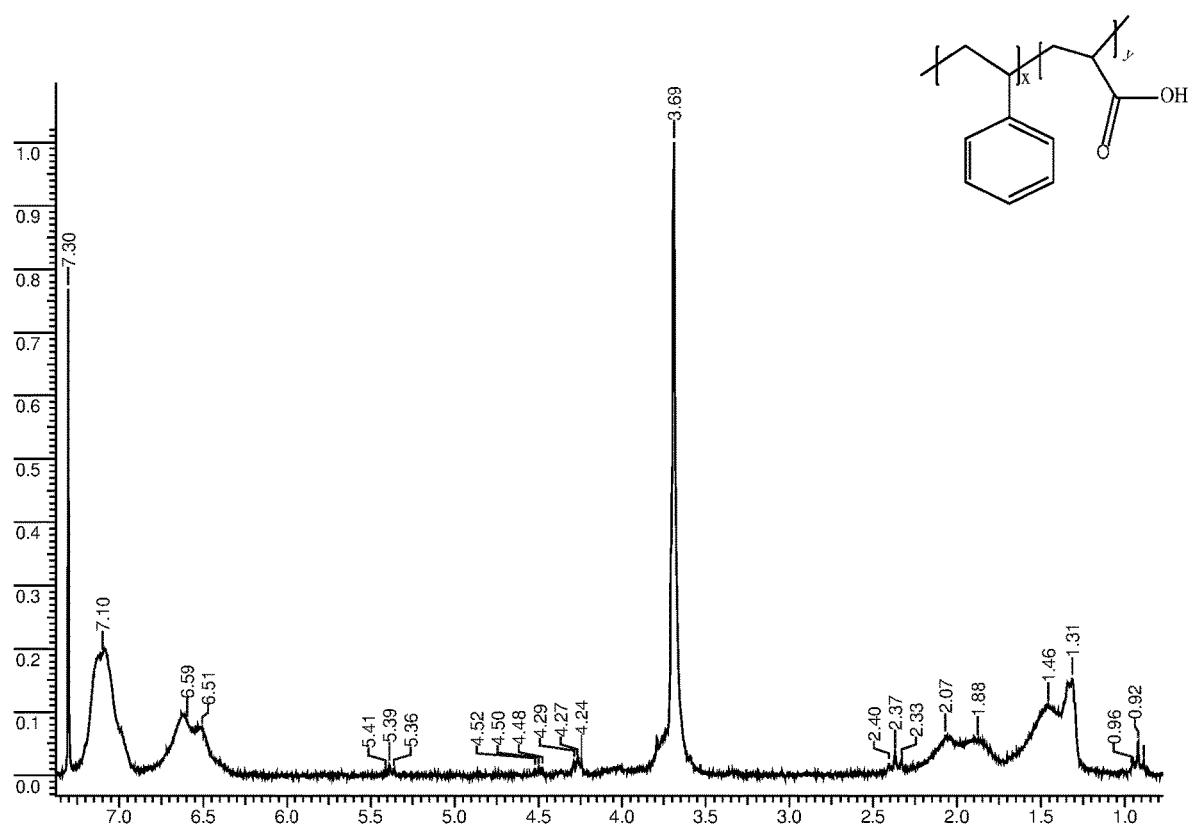
FIG. 2: $^1$H NMR spectra of styrene and acrylic acid co-polymer (Batch 17).

FIG. 2 shows the $^1$H NMR spectra of styrene-sodium acrylate co-polymer (Batch No. 17). Proton NMR is the application of nuclear magnetic resonance in NMR spectroscopy with respect to hydrogen-1 nuclei within the molecules of a substance. In order to determine the structure of its molecules, $CDCl_3$ is used as solvent and it show 7.27 chemical shift values.

Chemical Shift of Proton:

| Node | Chemical Shift | Comment |
| --- | --- | --- |
| OH | 10.63 | Carboxylic acid |
| CH | 7.21; 7.32 | Benzene |
| CH | 2.58; 2.37 | Methine |
| $CH_2$ | 1.77 | Methylene |
| $CH_3$ | 1.07 | Methyl | e) Determination of the Molecular Weight of Co-Polymer by Using GPC:

The polydispersity index as a measure of the width of molecular weight distributions (MWD) is theoretically very important. The weight average molecular weight and number average molecular weight of co-polymers of styrene-sodium acrylate (Batch No-17), co-polymer styrene-4-vinyl pyridine (Batch No. 33) and copolymer styrene-disodium fumarate (Batch No-68) are show in FIGS. 3, 4 and 5 respectively.

The Polydispersity index is calculated as follows $$\text{Polydispersity index } (Pd) = \frac{M_w}{M_n}$$

Figure 3:
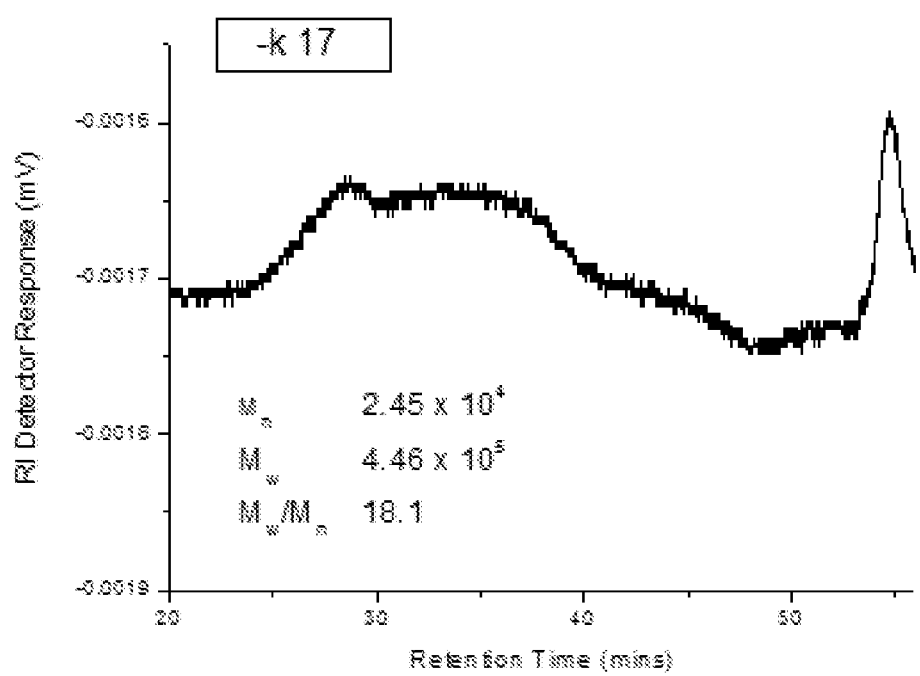
FIG. 3: GPC spectra for determination of PDI as well as Mw and Mn for co-polymer sodium acrylate-styrene (Batch No 17).
Figure 4:
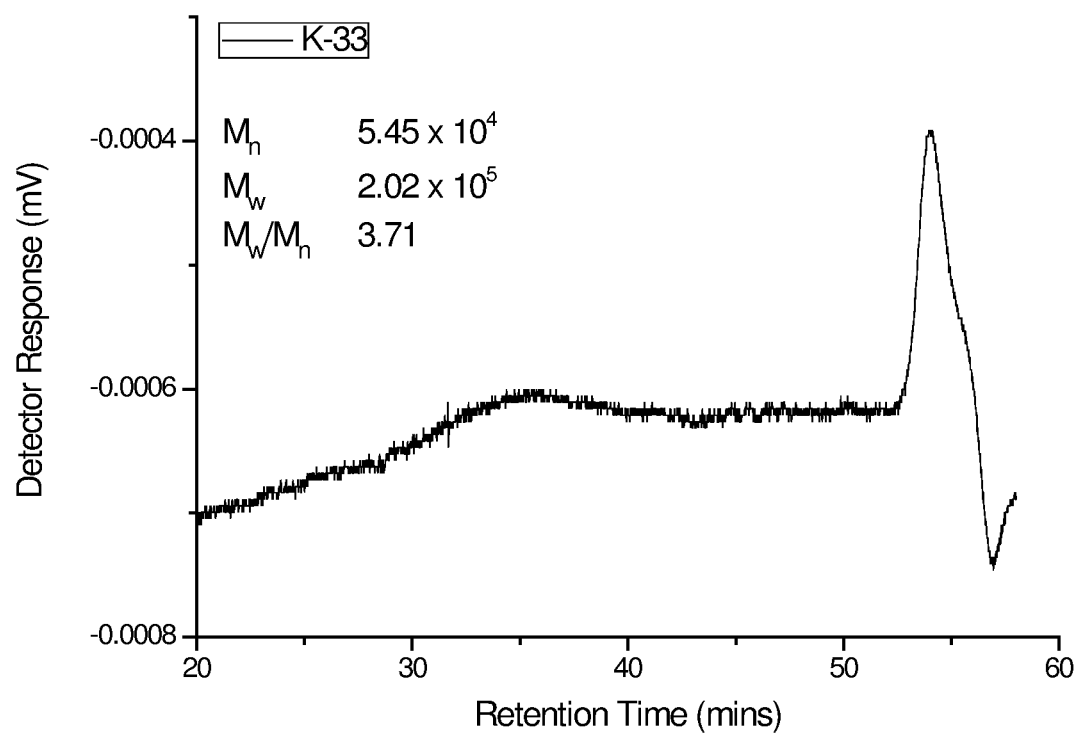
FIG. 4: GPC spectra for determination of PDI as well as Mw and Mn for co-polymer of styrene-4-vinyl pyridine (Batch No 33).
Figure 5:
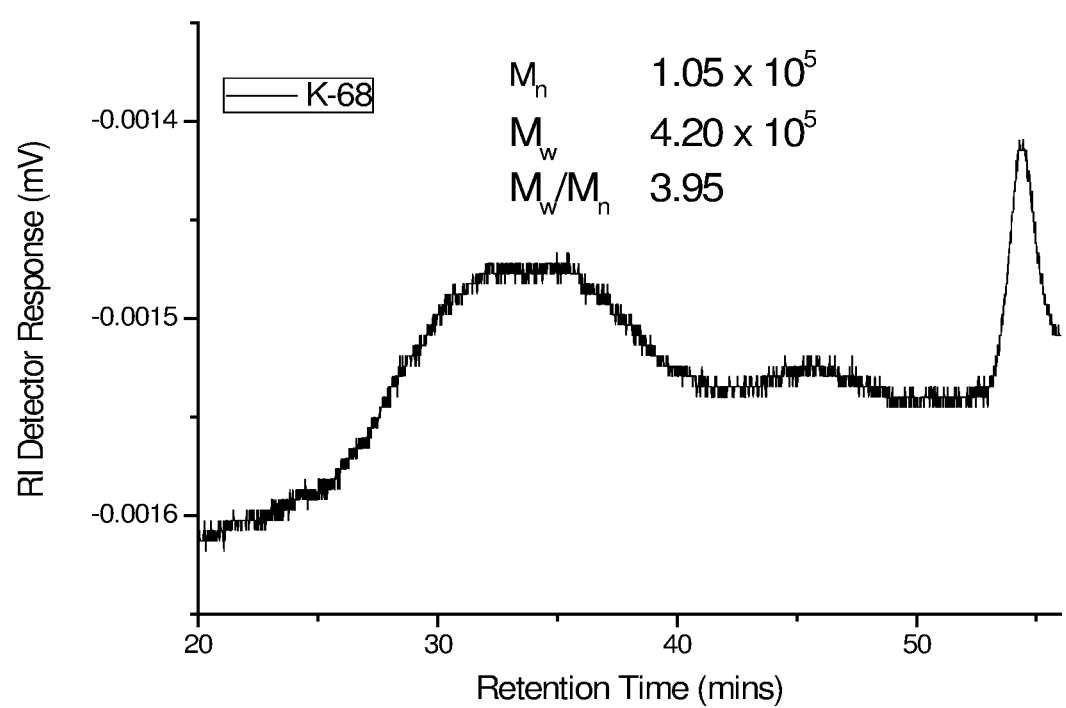
FIG. 5: GPC spectra for determination of PDI as well as Mw and Mn for co-polymer of styrene-disodium fumarate (Batch No 68).

Where, $M_w$: Weight-average molecular weight;
$M_n$: Number-average molecular weight The larger the polydispersity index, broader the molecular weight, a monodisperse polymer where the entire chain length is equal such as protein has an $M_w/M_n=1$. The best controlled polymers have polydispersity index is of 1.02 to 1.10. Step polymerization reactions typically yield values of $M_w/M_n$ around 2.0. Whereas chain reactions yield $M_w/M_n$ value between 1.5 to 20 (FIGS. 3, 4 and 5). Table IV shows the weight-average molecular weight, number-average molecular weight and polydispersity index of various batches of co-polymers.

f) Intrinsic Viscosity Measurement:

Viscosity of the co-polymers is investigated at different concentrations. All the measurements were performed at 25±2° C. using a Haake L water bath with Haake D3 circulator. Before every measurement, the viscometer was left in the circulator for 15 minutes in order to reach the desired temperature. After every measurement the viscometers were rinsed with water and before every measurement viscometers were rinsed with the samples that were going to be measured. Table IV show the intrinsic viscosity of different co-polymer batches.

g) Solubility of Co-Polymer in Different Solvents:

The solubility co-polymer was measured using dried powder at room temperature 25±2° C. The solubility of polymer identifies whether solution was clear, cloudy, or milky. Clear solution indicates that the polymer is reasonably soluble in particular solvent. The solubility of co-polymer is investigated in different non polar solvent xylene, toluene, benzene, cyclohexene, chloroform etc. The solubility of different co-polymers in different non-polar solvents is given in Table-V. The prepared co-polymer solution was used for demulsification of crude oil.

h) Characteristics of Crude Oil and its Effect on Demulsification

Most of the world's crude oil is produced in the form of an emulsion. These emulsions are droplets of water or brine dispersed in a continuum of crude oil and, hence, is known as water-in-oil (w/o) emulsions. The emulsion stability results from the presence of interfacial barrier preventing coalescence of the dispersed water droplets. This is due to the present of emulsifying agents of polar components such as asphaltenes, resins, wax and naphthenic acids in the crude oil.

There are many factors such as temperature, pH, water droplet size, viscosity, oil to brine ratio, interfacial tension and density difference between phases affects the stability of emulsion, and thereby stability ranging from a few minutes to years depending on the nature of the crude oil and to some extent the nature of water. Asphaltenes, resins, wax and naphthenic acids present in the crude oil affects the demulsification rate of crude oil. Resin and asphaltene which are insoluble in heptanes and are usually suspended as colloids enhance stability of the emulsion. Oils with more asphaltene content form more stable emulsions and oils with more resinous content form weaker emulsions. The typical characteristics of crude oil received from offshore process platform located in Western Offshore of ONG are given in Table VI.

Example 2 a) Effect of Monomer Ratio on Demulsification of Crude Oil

The effect of monomer ratios (sodium acrylate and styrene, sodium fumarate and styrene, 4-vinyl pyridine and styrene) on yield of co-polymer as well as demulsification crude oil was studied. The monomers ratio was varied from 5:95 to 50:50. The effect of monomer ratios on demulsification of actual crude oil received from the platform of ONGC located in Western offshore, India are given in Table VII and IX respectively. From these Tables it was observed that the monomers ratio has certain effect on the rate of demulsification.

b) Effect of Time on Demulsification Crude Oil

The time required for demulsification of crude oil on offshore is very important. Generally it is expected that the time required for the demulsification process should be in the range of 3-6 min. Table X shows the effect of time on demulsification of actual crude oil received from platform of ONGC located in Western offshore. From this Table X, it was observed that as curing time increases the rate of separation of water from crude oil increases but after 15 min, the rate of demulsification is nearly the same for most of batches.

c) Effect of Temperature on Demulsification of Crude Oil

Application of heat promotes the separation of water from crude oil because of i) reduces the viscosity of the oil ii) increases the mobility of the water droplets iii) increases the settling rate of water droplets iv) increases droplet collisions and favor coalescence v) weakens or ruptures the film on water droplets because of water expansion and enhances film drainage and coalescence vi) increases the difference in densities of the fluids that further enhances water-settling time and separation.

These above factors favors emulsion destabilization and water in oil separation. Table XI shows the effect of temperature on demulsification of simulated crude oil.

d) Effect of Pour Point on Demulsification of Crude Oil

The pour point of a crude oil is the temperature at which it becomes semi solid and loses its flow characteristics. In crude oil a high pour point is generally associated with high paraffin content. The characteristic of typical crude oil received from, platform of ONGC located in Western offshore, India, is shown in Table VI and from this Table it was found that the pour point of crude oil was 36° C. The demulsification of crude below this temperature is difficult hence most of the bottle tests are performed at 40° C. In general, the pour point is indicative of the amount of wax content in a crude oil.

Example 3

ONGC has provided crude oil sample from production manifold of offshore process platform located in Western offshore was utilized for testing of various developed low temperature demulsifiers. The performance of developed low temperature demulsifier was tested by using simulated crude oil emulsion as well as using actual crude oil emulsion supplied by ONGC from its Western offshore. The effect of various operating conditions like demulsification temperature, curing time and demulsifier dose on the demulsification of crude has been studied. The detailed results pertaining on demulsification of crude oil using various developed low temperature demulsifiers at laboratory testing as well as offshore testing are given below:

a) Laboratory Testing of Low Temperature Demulsifier (LTD) Using Simulated ONGC Crude Oil:

Initially the performance of developed low temperature demulsifier was tested by using crude oil received from offshore platform of ONGC located Western offshore, crude oil from production manifold of offshore process platform was used. The simulated crude oil emulsion was prepared by adding know quantities of water in crude oil. Table XI shows the performance of various LTD for separation of water from simulated crude oil.

b) Laboratory Testing of Low Temperature Demulsifier (LTD) Using ONGC Crude Oil Received from Platform in Western Offshore:

i) Bottle Test Report of Low Temperature Demulsifier for Batch Nos. 80, 82, 83, 85 & 17:

The bottle test report of low temperature demulsifier for batch No. 80, 82, 83, 85 & 17 are shown in Table XII. These low temperature demulsifier were evaluated for actual ONGC crude oil emulsion received from production manifold of offshore process platform of Western offshore. The initial water content in crude oil ($V_o$) is =28%.

ii) Bottle Test Report of Low Temperature Demulsifier for Batch No. 80 and 83:

The bottle test report of low temperature demulsifier for batch No. 80 and 83 are shown in Table XIII. These low temperature demulsifier were evaluated for actual ONGC crude oil emulsion received from production manifold of offshore process platform Western offshore. The initial water content in crude oil ($V_o$) is =53%.

c) Offshore Testing of Low Temperature Demulsifier (LTD) Using ONGC Crude Oil from Platform Located in Western Offshore:

The low temperature demulsifiers were evaluated for their efficiency for untreated crude oil emulsion of offshore process platform located in Western offshore. The evaluation of these low temperature demulsifiers was performed on offshore platform in order to find its efficiency at real conditions. The results obtained are summarized below in various Tables from XIV to XIX.

The efficiency of the demulsifier is calculated by using the following formula:

$$\text{Efficiency} = \frac{(v_1 - v_2) \times 100}{(2v_0 - v_2)}$$

Where,
$V_0$=Total water content in untreated crude oil
$V_1$=Volume of separated water using demulsifier
$V_2$=Volume of separated water without using demulsifier The bottle test report of low temperature demulsifier for batch No. 15, 17, 20, 33 & 53 are shown in Table XIV. The testing was done at demulsification temperature 35° C. on 3 and 4 Sep. 2013 for ONGC crude oil emulsion received from offshore process platform of Western offshore. From the Table XIV it was found demulsifier batch #33 and 17 gives very promising results as water content in the demulsified crude oil is 0.81% and 3.57%, while oil content in the effluent after treatment was 1073 ppm and 476 ppm respectively with 20 mg/l of demulsifier dose.

The bottle test report of low temperature demulsifier for batch No. 17, 68, 33, 71 and 73 are shown in Table XV. The these low temperature demulsifier were evaluated on 7 Nov. 2013 for ONGC crude oil emulsion received from production manifold of offshore process platform of Western Offshore. From the result Table XV it was found the water content in the treated oil (i.e. after demulsification) was in the range of 11 to 16%, however the oil content in the effluent after treatment was in the range of 124 to 173 ppm with 20 mg/l of demulsifier dose.

The bottle test report of low temperature demulsifier for batch No. 17, 68 and 33 are shown in Table XVI. Theses demulsifiers were evaluated at different demulsifiers doses and demulsification temperature 35° C. on 29 Nov. 2013 to 3 Dec. 2013 for ONGC crude oil emulsion received from production manifold of offshore process platform of Western offshore. From the results Table XVI it was found the water content in the treated oil (i.e. after demulsification) was in the range of 16 to 32%, however the oil content in the effluent after treatment was in the range of 194 to 458 ppm.

The Table-XVII shows the results of low temperature demulsifiers at different doses of demulsifiers as well as at different temperature. The low temperature demulsifiers (Batch #17, 68 and 33), were evaluated on 4 to 6 Feb. 2014 for ONGC crude oil emulsion received from production manifold of offshore process platform located at Western offshore. From the results Table XVII it was found the water content in the treated oil (i.e. after demulsification) was in the range of 9 to 62%, however the oil content in the effluent after treatment was in the range of 52 to 180 ppm.

The bottle test report of low temperature demulsifier for batch No. 17, 80, and 81 are shown in Table XVIII. Theses demulsifiers were evaluated at different demulsifiers doses and demulsification temperature 40° C. 19 to 21 Jun. 2014 and 30 Jun. to 1 Jul. 2014 for ONGC crude oil emulsion from production manifold of offshore process platform located at Western offshore. From the results Table XVIII it was found the Batch number 17 gives results as i) average water content in treated oil: 0.6% ii) average oil content in effluent: 96 ppm and efficiency (% v/v) of demulsifier is 99.14.

The bottle test report of low temperature demulsifier for batch No. 17 and 68 are shown in Table XIX Theses demulsifiers were evaluated using 10% demulsifiers solution at various doses and demulsification temperature 40° C. The batches were evaluated on 17 and 18 Jul. 2014 for ONGC crude oil emulsion from production manifold of offshore process platform located in Western offshore, from the results Table-XIX it was found the Batch number 68 and 17 gives results as i) average water content in treated oil is less than 1% ii) average oil content in effluent: 50 ppm and efficiency (% v/v) of demulsifier in the range of 96 to 99.

LIST OF TABLES

TABLE I

| Batch No | Monomers ratio (gm) | Time intervals between adding redox and reductant initiator (min) | Surfactant redox initiators and reductant initiators (gm) | Reaction temp. (° C.) | Time (min) | observations | Yield (%) |
|---|---|---|---|---|---|---|---|
| 17 | SA to Styrene = 90:10 | 10 | Tween80 = 56, APS = 1.6 and SMBS = 1.6 | 70 | 120 | Fine precipitation is formed in acetone | 92 |
| 18 | SA to Styrene = 5:95 | 10 | Tween80 = 56, APS = 1.6 and SMBS = 1.6 | 50 | 120 | Fine precipitation is formed in Methanol | 90 |
| 20 | SA to Styrene = 10:90 | 10 | Tween80 = 56, APS = 1.2 and SMBS = 1.2 | 50 | 120 | Fine precipitation in Methanol | 93 |
| 21 | SA to Styrene = 10:90 | 10 | Tween20 = 56, APS = 1.6 and SMBS = 1.6 | 50 | 120 | Fine precipitation is formed in Methanol | 89 |
| 37 | SA to Styrene = 5:45 | 10 | Tween80 = 56, APS = 0.8 and SMBS = 0.8 | 50 | 120 | Fine precipitation is formed in Methanol | 90 |
| 77 | SA to Styrene = 30:70 | 10 | Tween80 = 56, APS = 1.6 and SMBS = 1.6 | 70 | 30 | Fine precipitation is formed in acetone | 82 |
| 78 | SA to Styrene = 30:70 | 10 | Tween80 = 56, APS = 1.6 and SMBS = 1.6 | 70 | 60 | Fine precipitation is formed in acetone | 84 |
| 79 | SA to Styrene = 30:70 | 10 | Tween80 = 56, APS = 1.6 and SMBS = 1.6 | 70 | 90 | Fine precipitation is formed in acetone | 87 |
| 80 | SA to Styrene = 50:50 | 10 | Tween80 = 56, APS = 1.6 and SMBS = 1.6 | 70 | 30 | Fine precipitation is formed in acetone | 80 |
| 81 | SA to Styrene = 50:50 | 10 | Tween80 = 56, APS = 1.6 and SMBS = 1.6 | 70 | 60 | Fine precipitation is formed in acetone | 82 |
| 82 | SA to Styrene = 50:50 | 10 | Tween80 = 56, APS = 1.6 and SMBS = 1.6 | 70 | 90 | Fine precipitation is formed in acetone | 85 |
| 83 | SA to Styrene = 50:50 | 5 | Tween80 = 56, APS = 3.2 and SMBS = 3.2 | 70 | 30 | Fine precipitation is formed in acetone | 81 |
| 84 | SA to Styrene = 50:50 | 5 | Tween80 = 56, APS = 3.2 and SMBS = 3.2 | 70 | 60 | Fine precipitation is formed in acetone | 73 |
| 85 | SA to Styrene = 80:20 | 5 | Tween80 = 56, APS = 3.2 and SMBS = 3.2 | 70 | 60 | Fine precipitation is formed in acetone | 78 |
| 87 | SA to Styrene = 30:70 | 2 | Tween80 = 56, APS = 3.2 and SMBS = 3.2 | 70 | 60 | Fine precipitation is formed in acetone | 74 |
| 88 | SA to Styrene = 50:50 | 2 | Tween80 = 56, APS = 3.2 and SMBS = 3.2 | 70 | 90 | Fine precipitation is formed in acetone | 78 |
| 94 | SA to Styrene = 55:45 | 10 | Tween80 = 56, APS = 3.2 and SMBS = 3.2 | 70 | 30 | Fine precipitation is formed in acetone | 76 |
| 95 | SA to Styrene = 55:45 | 10 | Tween80 = 56, APS = 3.2 and SMBS = 3.2 | 70 | 90 | Fine precipitation is formed in acetone | 85 |
| 96 | SA to Styrene = 60:40 | 10 | Tween80 = 56, APS = 3.2 and SMBS = 3.2 | 70 | 90 | Fine precipitation is formed in acetone | 67 |
| 97 | SA to Styrene = 60:40 | 10 | Tween80 = 56, APS = 4 and SMBS = 4 | 70 | 90 | Fine precipitation is formed in acetone | 76 |

TABLE I-continued

| Batch No | Monomers ratio (gm) | Time intervals between adding redox and reductant initiator (min) | Surfactant redox initiators and reductant initiators (gm) | Reaction temp. (° C.) | Time (min) | observations | Yield (%) |
|---|---|---|---|---|---|---|---|
| 98 | SA to Styrene = 55:45 | 10 | Tween80 = 56, APS = 4 and SMBS = 4 | 70 | 90 | Fine precipitation is formed in acetone | 68 |
| 26 | Methacrylic acid to Styrene = 10:90 | 10 | Tween20 = 56, APS = 1.6 and SMBS = 1.6 | 50 | 120 | Fine precipitation was formed in methanol | 78 |
| 27 | Sodium methacrylic acid to Styrene = 10:90 | 10 | Tween20 = 56, APS = 1.6 and SMBS = 1.6 | 50 | 120 | Fine precipitation was formed in methanol | 90 |
| 30 | Methacrylic acid to Styrene to Butyl acrylate = 10:60:30 | 10 | Tween20 = 56, APS = 1.6 and SMBS = 1.6APS = 1.6 | 50 | 120 | Fine precipitation in methanol | 92 |

TABLE II

| Batch No | Monomers ratio (gm) | Time intervals between adding redox and reductant initiator | Surfactant redox initiators and reductant initiators (gm) | Reaction temp. (° C.) | Time (min) | observations | Yield (%) |
|---|---|---|---|---|---|---|---|
| 68 | Sodium difumerate to styrene = 2:48 | 10 | Tween80 = 28, APS = 0.8 and SMBS = 0.8 | 70 | 120 | Fine precipitation obtained | 90 |
| 106 | Sodium difumerate to styrene = 5:95 | 10 | Tween80 = 56, APS = 1.6 and SMBS = 1.6 | 70 | 30 | fine precipitation is formed in acetone | 90 |
| 108 | Sodium difumerate to styrene = 7.5:92.5 | 10 | Tween80 = 56, APS = 4 and SMBS = 4 | 70 | 120 | fine precipitation is formed in acetone | 92 |
| 110 | Sodium difumerate to styrene = 10:90 | 10 | Tween80 = 56, APS = 1.6 and SMBS = 1.6 | 70 | 180 | fine precipitation is formed in acetone | 80 |
| 111 | Sodium difumerate to styrene = 15:85 | 10 | Tween80 = 56, APS = 1.6 and SMBS = 1.6 | 70 | 150 | fine precipitation is formed in acetone | 85 |
| 112 | Sodium difumerate to styrene = 15:85 | 10 | Tween80 = 56, APS = 4 and SMBS =4 | 70 | 180 | fine precipitation is formed in acetone | 86 |
| 114 | Sodium difumerate to styrene = 20:80 | 10 | Tween80 = 56, APS = 4 and SMBS = 4 | 70 | 240 | fine precipitation is formed in acetone | 80 |
| 116 | Sodium difumerate to styrene = 15:85 | 10 | Tween80 = 56, APS = 4 and SMBS = 4 | 70 | 240 | fine precipitation is formed in acetone | 98 |

TABLE III

| Batch No | Monomers ratio (gm) | Time intervals between adding redox and reductant initiator | Surfactant redox initiators and reductant initiators (gm) | Reaction temp. (° C.) | Time (min) | observations | Yield (%) |
|---|---|---|---|---|---|---|---|
| 33 | 4-Vinyl Pyridine to styrene = 10:90 | 10 | Tween20 = 56, APS = 1.6 and SMBS = 1.6 | 50 | 120 | Fine precipitation is formed in acetone | 90 |
| 34 | 4-Vinyl Pyridine to styrene = 10:90 | 10 | Tween20 = 56,APS = 1.6 and SMBS = 1.6 | 70 | 120 | Fine Precipitation was formed in Methanol | 92 |
| 4 | 4-Vinyl Pyridine to styrene = 20:80 | 10 | Tween80 = 56, APS = 4 and SMBS = 4 | 70 | 90 | fine precipitation is formed in acetone | 96 |
| 120 | 4-Vinyl Pyridine to styrene = 30:70 | 5 | Tween80 = 56, APS = 3.2 and SMBS = 3.2 | 70 | 90 | fine precipitation is formed in acetone | 70 |

*Note:
Prior to commencing reaction, the 4-Vinyl Pyridine is treated with 50% (stoichiometric) amount of HCl to quarternise pyridine

TABLE IV

| Sr. No | Batch No. | Monomers ratio (gm) | Surfactant and initiators concentration (gm) | Viscosity (Ns/M$^2$) | Molecular Weight |
|---|---|---|---|---|---|
| 1 | 15 | Sodium acrylate to styrene = 10:90 | APS = 1.6 (g) SMBS = 1.6 (g) Tween 80 = 56 (g) | 0.411 | Mw = 1.17 * 10$^5$ Mn = 4.52 * 10$^4$ Mw/Mn = 2.58 |
| 2 | 17 | Sodium acrylate to styrene = 10:90 | APS = 1.6 (g) SMBS = 1.6 (g) Tween 80 = 56 (g) | 0.685 | Mw = 4.46 * 10$^5$ Mn = 2.45 * 10$^4$ Mw/Mn = 18.1 |

TABLE IV-continued

| Sr. No | Batch No. | Monomers ratio (gm) | Surfactant and initiators concentration (gm) | Viscosity (Ns/M$^2$) | Molecular Weight |
|---|---|---|---|---|---|
| 3 | 20 | Sodium acrylate to styrene = 10:90 | APS = 1.2 (g) SMBS = 1.2(g) Tween 80 = 56 (g | 0.455 | Mw = 3.33 * 10$^5$ Mn = 1.07 * 10$^5$ Mw/Mn = 3.08 |
| 4 | 33 | 4-vinyl pyridine to styrene = 10:90 | APS = 1.6 (g) SMBS = 1.6 (g) Tween 20 = 56 (g) | 0.288 | Mw = 2.02 * 10$^5$ Mn = 5.45 * 10$^4$ Mw/Mn = 3.71 |
| 5 | 34 | 4-vinyl pyridine to styrene = 10:90 | APS = 1.6 (g) SMBS = 1.6 (g) Tween 20 = 56 (g) | 0.834 | Mw = 6.45 * 10$^5$ Mn = 1.34 * 10$^5$ Mw/Mn = 4.84 |
| 6 | 68 | Sodium Difumerate to Styrene = 4:96 | APS = 1.6 (g) SMBS = 1.6 (g) Tween 20 = 56 (g) | 0.348 | Mw = 4.20 * 10$^5$ Mn = 1.05 * 10$^5$ Mw/Mn = 3.95 |
| 7 | 80 | Sodium acrylate to styrene = 50:50 | APS = 1.6 (g) SMBS = 1.6 (g) Tween 80 = 56 (g) | 0.797 | Mw = 2.52 * 10$^5$ Mn = 9.34 * 10$^4$ Mw/Mn = 2.69 |
| 8 | 81 | Sodium acrylate to styrene = 50:50 | APS = 1.6 (g) SMBS = 1.6 (g) Tween 80 = 56 (g) | 0.932 | Mw = 2.23 * 10$^5$ Mn = 6.27 * 10$^4$ Mw/Mn = 3.56 |
| 9 | 83 | Sodium acrylate to styrene = 50:50 | APS = 3.2 (g) SMBS = 3.2 (g) Tween 80 = 56 (g) | 0.366 | Mw = 2.02 * 10$^5$ Mn = 6.11 * 10$^4$ Mw/Mn = 3.30 |
| 10 | 85 | Sodium acrylate to styrene = 70:30 | APS = 3.2 (g) SMBS = 3.2 (g) Tween 80 = 56 (g) | 0.911 | Mw = 2.29 * 10$^5$ Mn = 7.59 * 10$^4$ Mw/Mn = 3.02 |
| 11 | 96 | Sodium acrylate to styrene = 60:40 | APS = 3.2 (g) SMBS = 3.2 (g) Tween 80 = 56 (g) | 0.259 | Mw = 1.07 * 10$^5$ Mn = 1.16 * 10$^4$ Mw/Mn = 9.20 |
| 12 | 97 | Sodium acrylate to styrene = 60:40 | APS = 4 (g) SMBS = 4 (g) Tween 80 = 56 (g) | 0.459 | Mw = 1.46 * 10$^5$ Mn = 1.47 * 10$^4$ Mw/Mn = 9.89 |

TABLE V

| Co-polymer solubility (w/v %) | Non polar solvents | | | | |
|---|---|---|---|---|---|
| | Mixed xylene Solution Condition | Toluene Solution Condition | Chloroform Solution Condition | Cyclohexene Solution Condition | Benzene Solution Condition |
| 1 | Clear solution | Clear solution | Clear solution | Clear solution | Clear solution |
| 2 | Clear solution | Clear solution | Clear solution | Clear solution | Clear solution |
| 5 | Clear solution | Clear solution | slightly viscous solution | Clear solution | slightly viscous solution |
| 10 | slightly viscous solution | slightly viscous solution | Viscous solution | slightly viscous solution | Viscous solution |
| 15 | viscous solution | viscous solution | highly viscous solution | viscous solution | highly viscous solution |

TABLE VI

| Parameter | Result |
|---|---|
| Density at 15° C. | 0.8488 |
| Sp. gravity at 60/60° F. | 0.8494 |
| API Gravity (60° F.) | 35.08 |
| Pour point (° C.) | 36 |
| B.S. and W (% by vol.) | 0.2 |
| Kinematic Viscosity at 37.8° C. (cst) | 8.97 |
| Asphaltene content (% w/w) | 0.39 |
| Resin content (% w/w) | 8.1 |
| Wax content (% w/w) | 23.6 |
| KUOP | 12.0 |
| Molecular weight | 260 |

TABLE VII

| Batch No. | Monomers ratio (gm) | Demulsifying temp. (° C.) | Demulsifier dose (ppm) | Curing time (min) | Water separated from 100 ml crude oil (ml) | Initial water content in 100 ml crude oil (ml) |
| --- | --- | --- | --- | --- | --- | --- |
| 17 | 90:10 | 40 | 600 | 6 | 24 | 28 |
| 85 | 80:20 | 40 | 400 | 6 | 16 | 28 |
| 77 | 70:30 | 40 | 300 | 6 | 7 | 28 |
| 96 | 60:40 | 40 | 400 | 6 | 18 | 28 |
| 80 | 50:50 | 40 | 600 | 6 | 28 | 28 |

TABLE VIII

| Batch No. | Monomers ratio (gm) | Demulsifying temp. (° C.) | Demulsifier dose (ppm) | Curing time (min) | Water separated from 100 ml crude oil (ml) | Initial water content in 100 ml crude oil (ml) |
| --- | --- | --- | --- | --- | --- | --- |
| 110 | 90:10 | 40 | 500 | 6 | 43 | 68 |
| 116 | 85:15 | 40 | 200 | 6 | 48 | 68 |
| 114 | 80:20 | 40 | 300 | 6 | 54 | 68 |

TABLE IX

| Batch No. | Monomers ratio (gm) | Demulsifying temp. (° C.) | Demulsifier dose (ppm) | Curing time (min) | Water separated from 100 ml crude oil (ml) | Initial water content in 100 ml crude oil (ml) |
| --- | --- | --- | --- | --- | --- | --- |
| 33 | 90:10 | 40 | 300 | 6 | 47 | 68 |
| 118 | 80:20 | 40 | 400 | 6 | 35 | 68 |
| 120 | 70:30 | 40 | 200 | 6 | 20 | 68 |

TABLE X

| Batch No. | Emulsion volume (ml) | Demulsifier dose (ppm) | Demulsification Temp. (° C.) | Water separate from 100 ml crude oil for different time (ml) | | | |
| --- | --- | --- | --- | --- | --- | --- | --- |
| | | | | 6 min | 10 min | 15 min | 20 min |
| Blank | 100 | — | 40 | 8 | 10 | 18 | 19 |
| 80 | 100 | 100 | 40 | 10 | 19.5 | 22 | 28 |
| 80 | 100 | 200 | 40 | 12 | 21 | 26.5 | 28 |
| 80 | 100 | 400 | 40 | 23.5 | 27 | 28 | 28 |
| 80 | 100 | 600 | 40 | 28 | 29 | 28 | 28 |
| 81 | 100 | 100 | 40 | 9.5 | 17.5 | 20 | 26 |
| 81 | 100 | 200 | 40 | 3 | 9 | 17 | 23 |
| 82 | 100 | 400 | 40 | 20 | 24.5 | 27.5 | 28 |
| 85 | 100 | 400 | 40 | 18 | 22 | 24 | 27 |
| 83 | 100 | 100 | 40 | 13.5 | 19.5 | 22.5 | 24.5 |
| 83 | 100 | 200 | 40 | 13 | 22.5 | 25 | 28 |
| 83 | 100 | 300 | 40 | 10 | 20 | 23.5 | 28 |
| 83 | 100 | 400 | 40 | 12.5 | 17.5 | 21 | 28 |
| 83 | 100 | 600 | 40 | 14.5 | 22 | 25.5 | 27 |
| 83 | 100 | 500 | 40 | 15 | 20.5 | 24.5 | 26 |
| 83 | 100 | 1000 | 40 | 18 | 27.5 | 28.5 | 28 |
| 83 | 100 | 1500 | 40 | 19 | 22 | 25.5 | 28 |
| 94 | 100 | 100 | 40 | 2.5 | 3 | 8.5 | 11 |
| 94 | 100 | 400 | 40 | 7.5 | 18.5 | 26 | 28 |
| 95 | 100 | 100 | 40 | 4 | 7 | 11.5 | 14.5 |
| 95 | 100 | 400 | 40 | 6 | 22 | 26.5 | 28 |
| 96 | 100 | 200 | 40 | 7.5 | 11 | 15.5 | 20 |
| 96 | 100 | 400 | 40 | 18 | 20 | 25.5 | 27 |
| 97 | 100 | 100 | 40 | 16 | 20.5 | 22.5 | 24 |
| 97 | 100 | 200 | 40 | 7.5 | 10 | 17 | 22.5 |
| 98 | 100 | 200 | 40 | 6.5 | 9 | 14 | 18 |
| 17 | 100 | 100 | 40 | 18 | 21.5 | 23. | 25 |
| 17 | 100 | 400 | 40 | 22 | 24.5 | 27 | 28 |
| 17 | 100 | 600 | 40 | 24 | 26 | 26.5 | 28 |
| 33 | 100 | 100 | 40 | 0 | 3 | 17 | 23 |

TABLE X-continued

| Batch No. | Emulsion volume (ml) | Demulsifier dose (ppm) | Demulsification Temp. (° C.) | Water separate from 100 ml crude oil for different time (ml) | | | |
|---|---|---|---|---|---|---|---|
| | | | | 6 min | 10 min | 15 min | 20 min |
| 33 | 100 | 200 | 40 | 1 | 5.5 | 22.5 | 26 |
| 33 | 100 | 300 | 40 | 3 | 6 | 18 | 24 |

TABLE XI

| Batch No. | Simulated crude oil and water mixture (ml of crude oil + ml water) | Demulsifier dose (ppm) | Demulsification temperature (° C.) | Amount of water separated (ml) | % Water removal |
|---|---|---|---|---|---|
| 15 | 180 + 20 | 100 | 27 | 15 | 75 |
| 15 | 180 + 20 | 50 | 40 | 13 | 65 |
| 17 | 180 + 20 | 50 | 27 | 14.5 | 72.5 |
| 17 | 180 + 20 | 100 | 27 | 18 | 90 |
| 18 | 180 + 20 | 50 | 27 | 3 | 15 |
| 21 | 180 + 20 | 100 | 40 | 12 | 60 |
| 25 | 180 + 20 | 50 | 40 | 6 | 30 |
| 25 | 180 + 20 | 100 | 40 | 10 | 50 |
| 26 | 180 + 20 | 50 | 40 | 17 | 85 |
| 27 | 180 + 20 | 50 | 40 | 6 | 30 |
| 30 | 180 + 20 | 50 | 40 | 6 | 30 |
| 30 | 180 + 20 | 100 | 40 | 13 | 65 |
| 20 | 180 + 20 | 40 | 40 | 11.5 | 57.5 |
| 34 | 180 + 20 | 40 | 40 | 10 | 50 |
| 34 | 180 + 20 | 40 | 40 | 13.5 | 67.5 |
| 30 | 180 + 20 | 40 | 40 | 15 | 75 |
| 33 | 180 + 20 | 40 | 40 | 19 | 95 |
| 37 | 180 + 20 | 40 | 40 | 10 | 50 |
| 68 | 80 + 20 | 100 | 40 | 27 | 61.36 |
| 17 + 68 | 80 + 20 | 200 | 40 | 10 | 22.72 |
| 33 + 68 | 80 + 20 | 300 | 40 | 18 | 54.54 |

TABLE XII

| Batch No. | Emulsion volume (ml) | Demulsifier dose (ppm) | Demulsification Temp. (° C.) | Curing Time (min) | Water separate from 100 ml crude oil (ml) |
|---|---|---|---|---|---|
| Blank | 100 | — | 40 | 6 | 5 |
| 80 | 100 | 400 | 40 | 6 | 23 |
| 80 | 100 | 600 | 40 | 6 | 28 |
| 82 | 100 | 400 | 40 | 6 | 20 |
| 85 | 100 | 400 | 40 | 6 | 18 |
| 83 | 100 | 100 | 40 | 6 | 13 |
| 83 | 100 | 200 | 40 | 6 | 13 |
| 83 | 100 | 600 | 40 | 6 | 13 |
| 83 | 100 | 400 | 40 | 6 | 12.5 |
| 83 | 100 | 600 | 40 | 6 | 14 |
| 83 | 100 | 500 | 40 | 6 | 15 |
| 83 | 100 | 1000 | 40 | 6 | 18 |
| 83 | 100 | 1500 | 40 | 6 | 19 |
| 17 + 83 | 100 | 100 + 100 = 200 | 40 | 6 | 19 |
| 17 | 100 | 100 | 40 | 6 | 18 |
| 17 | 100 | 400 | 40 | 6 | 22 |
| 17 | 100 | 600 | 40 | 6 | 24 |

* Initial water content in the crude oil = 28%

TABLE XIII

| Batch No. | Emulsion volume (ml) | Initial water content in the crude oil (ml) | Demulsifier dose (ppm) | Demulsification temp. (° C.) | Curing Time (min) | Water separate from 100 ml crude oil (ml) |
|---|---|---|---|---|---|---|
| Blank | 100 | 53 | — | 40 | 6 | 6 |
| 80 | 100 | 53 | 100 | 40 | 6 | 36 |
| 80 | 100 | 53 | 200 | 40 | 6 | 35 |
| 80 | 100 | 53 | 300 | 40 | 6 | 35 |
| 80 | 100 | 53 | 400 | 40 | 6 | 38 |
| 83 | 100 | 53 | 100 | 40 | 6 | 25 |
| 83 | 100 | 53 | 200 | 40 | 6 | 41 |
| 83 | 100 | 53 | 300 | 40 | 6 | 30 |
| 83 | 100 | 53 | 400 | 40 | 6 | 30 |

TABLE XIV

Performance evaluation of low temperature demulsifier

| Demulsifier Batch No | | Batch 33 | | Batch 17 | | Batch 68 | Batch 15 | Batch 20 | Batch 53 |
|---|---|---|---|---|---|---|---|---|---|
| Emulsion volume (ml) | 200 | 200 | 200 | 200 | 200 | 200 | 200 | 200 | 200 |
| Demulsifier dose (mg/l) | 20 | 20 | 20 | 20 | 20 | 20 | 20 | 20 | 20 |
| Dosing temp (° C.) | 35 | 35 | 35 | 35 | 35 | 35 | 35 | 35 | 35 |
| Curing Temp. (° C.) | 35 | 35 | 35 | 35 | 35 | 35 | 35 | 35 | 35 |
| Curing time (min) | 3 | 6 | 3 | 6 | 3 | 6 | 6 | 6 | 6 |
| Results required | | | | | | | | | |
| W/C in treated oil (% v/v) | — | 0.81 | 20.48 | 3.57 | — | 6.28 | Negligible water separated | | |
| Oil content in effluent after treatment (ppm) | — | 1073 | 1395 | 476 | — | 211 | — | — | — |
| Efficiency by (% v/v) | 41.66 | 91.66 | 8.1 | 82.92 | — | 89.60 | — | — | — |

TABLE XV

Performance evaluation of low temperature demulsifier

| | Demulsifier Batch No | | | | |
|---|---|---|---|---|---|
| | Batch # 17 | Batch # 68 | Batch # 33 | Batch # 71 | Batch # 73 |
| Emulsion volume (ml) | 200 | 200 | 200 | 200 | 200 |
| Demulsifier dose (mg/l) | 20 | 20 | 20 | 20 | 20 |
| Dosing temperature (° C.) | 35 | 35 | 35 | 35 | 35 |
| Curing temperature (° C.) | 35 | 35 | 35 | 35 | 35 |
| Curing time (min) | 6 | 6 | 6 | 6 | 6 |
| W/C in treated oil (% v/v) | 16 | 12.6 | 11.2 | 12 | 13.2 |
| Oil content in effluent after treatment (mg/l) | 173 | 167 | 158 | 168 | 124 |
| Efficiency by (% v/v) | 34.04 | 48.9 | 59.57 | 55.32 | 42.55 |

TABLE XVI

Performance evaluation of low temperature demulsifier

| | Demulsifier Batch No and its concentration (w/v %) | | | |
|---|---|---|---|---|
| | Batch No-17 (5% co-polymer solution in xylene) | Batch No-17 (7.5% co-polymer solution in xylene) | Batch No-17 (10% co-polymer solution in xylene) | Batch No-68 (5% co-polymer solution in xylene) |
| Emulsion volume (ml) | 200 | 200 | 200 | 200 |
| Demulsifier dose (ml) | 0.4 | 0.4 | 0.4 | 0.4 |
| Dosing temperature (° C.) | 35 | 35 | 35 | 35 |
| Curing temperature (° C.) | 35 | 35 | 35 | 35 |
| Curing time (min) | 6 | 6 | 6 | 6 |
| W/C in treated oil (% v/v) | 32 | 30 | 32 | 28 |
| Oil content in effluent after treatment (ppm) | 194 | 205 | 458 | 150 |
| Efficiency by (% v/v) | (—) value | 4.76 | 1.6 | 9.5 |

TABLE XVI-continued

Performance evaluation of low temperature demulsifier

| | Demulsifier Batch No and its concentration (w/v %) | | | |
|---|---|---|---|---|
| | Batch No-68 (7.5% co-polymer solution in xylene) | Batch No-68 (10% co-polymer solution in xylene) | Batch No-33 (5% co-polymer solution in xylene) | Batch No-33 (7.5% co-polymer solution in xylene) |
| Emulsion volume (ml) | 200 | 200 | 200 | 200 |
| Demulsifier dose (ml) | 0.4 | 0.4 | 0.4 | 0.4 |
| Dosing temperature (° C.) | 35 | 35 | 35 | 35 |
| Curing temperature (° C.) | 35 | 35 | 35 | 35 |
| Curing time (min) | 6 | 6 | 6 | 6 |
| W/C in treated oil (% v/v) | 26 | 16 | 30 | 24 |
| Oil content in effluent after treatment (ppm) | 287 | 246 | 310 | 235 |
| Efficiency by (% v/v) | Nil | 44.6 | Nil | 24.6 |

TABLE XVII

Performance evaluation of low temperature demulsifier

| | Demulsifier Batch No and its conc. (% w/v) | | | | |
|---|---|---|---|---|---|
| | Batch No 17 (1% co-polymer solution in xylene) | Batch No 17 (1% solution in xylene) | Batch No 17 (1% co-polymer solution in xylene) | Batch No 17 (1% co-polymer solution in xylene) | Batch No 68 (1% co-polymer solution in xylene) |
| Emulsion volume (ml) | 200 | 200 | 200 | 200 | 200 |
| Demulsifier dose (ml) | 0.8 | 1.2 | 0.4 | 0.8 | 0.8 |
| Dosing temperature (° C.) | 35 | 35 | 40 | 40 | 35 |
| Curing temperature (° C.) | 35 | 35 | 40 | 40 | 35 |
| Curing time (min) | 6 | 6 | 6 | 6 | 6 |
| W/C in treated oil (% v/v) | 23 | 46 | 12.5 | 9 | 62 |
| Oil content in effluent after treatment (mg/l) | 56 | 64 | 52 | 82 | — |
| Efficiency (% v/v) | 52.98 | 21.04 | 63.45 | 76.14 | (—) value |

| | Demulsifier Batch No and Conc. (% w/v) | | | | |
|---|---|---|---|---|---|
| | Batch # 68 (1% co-polymer solution in xylene) | Batch # 68 (1% co-polymer solution in xylene) | Batch # 33 (1% co-polymer solution in xylene) | Batch # 33 (1% co-polymer solution in xylene) | Batch # 33 (1% co-polymer solution in xylene) |
| Emulsion volume (ml) | 200 | 200 | 200 | 200 | 200 |
| Demulsifier dose (ml) | 0.4 | 0.8 | 0.8 | 0.4 | 0.8 |
| Dosing temperature (° C.) | 40 | 40 | 35 | 35 | 40 |
| Curing temperature (° C.) | 40 | 40 | 35 | 35 | 40 |
| Curing time (min) | 6 | 6 | 6 | 6 | 6 |
| W/C in treated oil (% v/v) | 40 | 41 | 63.6 | 38 | 38 |
| Oil content in effluent after treatment (ppm) | 180 | 164 | — | 168 | 110 |
| Efficiency by (% v/v) | 38.82 | — | — | (—) value | (—) value |

TABLE XVII

Performance evaluation of low temperature demulsifier

| | Demulsifier Batch No and Conc. (% w/v) | | | | | |
|---|---|---|---|---|---|---|
| | Batch # 17 (1% co-polymer solution in xylene) | Batch # 17 (1% co-polymer solution in xylene) | Batch # 17 (1% co-polymer solution in xylene) | Batch # 80: (1% co-polymer solution in xylene) | Batch # 81 (2% co-polymer solution in xylene) | Batch # 81 (5% co-polymer solution in xylene) |
| Emulsion volume (ml) | 100 | 100 | 200 | 200 | 100 | 100 |
| Demulsifier dose (ml | 6 | 6 | 12 | 12 | 3 | 4 |

TABLE XVII-continued

Performance evaluation of low temperature demulsifier

| | Demulsifier Batch No and Conc. (% w/v) | | | | | |
|---|---|---|---|---|---|---|
| | Batch # 17 (1% co-polymer solution in xylene) | Batch # 17 (1% co-polymer solution in xylene) | Batch # 17 (1% co-polymer solution in xylene) | Batch # 80: (1% co-polymer solution in xylene) | Batch # 81 (2% co-polymer solution in xylene) | Batch # 81 (5% co-polymer solution in xylene) |
| Dosing temperature (° C.) | 40 | 40 | 40 | 40 | 40 | 40 |
| Curing temperature (° C.) | 40 | 40 | 40 | 40 | 40 | 40 |
| Curing time (min) | 6 | 6 | 6 | 6 | 6 | 6 |
| W/C in treated oil (% v/v) | 0.4 | 0.8 | 0.6 | 37.5 | 8 | 8 |
| Oil content in effluent after treatment (ppm) | 95 | 98 | 95 | 226 | 454 | 598 |
| Efficiency by (% v/v) | 99.14 | 99.14 | 99.14 | 64.6 | 86.2 | 86.2 |
| Remark | — | Rpt. test | Rpt. test | — | — | — |

TABLE XIX

Performance evaluation of low temperature demulsifier

| | Demulsifier batch No and its conc. (% w/v) | | | | |
|---|---|---|---|---|---|
| | Batch no: 17 (10% co-polymer solution in xylene) | Batch no: 68 (10% co-polymer solution in xylene) | Batch no: 68 (10% co-polymer solution in xylene) | Batch no: 68 (10% co-polymer solution in xylene) | Batch no: 17 (10% co-polymer solution in xylene) |
| Emulsion volume (ml) | 100 | 200 | 200 | 200 | 200 |
| Demulsifier dose (ppm) | 0.6 | 1.0 | 0.8 | 0.6 | 1.7 |
| Dosing temperature (° C.) | 40 | 40 | 40 | 40 | 40 |
| Curing temperature (° C.) | 40 | 40 | 40 | 40 | 40 |
| Curing time (min) | 6 | 6 | 6 | 6 | 6 |
| W/C in treated oil (% v/v) | — | 0.6 | 0.9 | — | 0.5 |
| Oil content in effluent after treatment (ppm) | — | 25 | 42 | — | 35 |
| Organic chloride (ppm) | — | 13.75 | — | — | 14.25 |
| Efficiency by (% v/v) | 0 | 98.3 | 96.7 | — | 96.7 |
| Remarks | Upon heating, emulsion was found unstable | — | — | No clear separation of water and oil | — |

ADVANTAGES OF INVENTION

1) Cost of demulsifier is very low as compared to commercial one.
2) The novel demulsifiers having molecular weight in the range of 10000 to 600000 Daltons.
3) A present process of demulsification using novel demulsifiers, wherein the efficiency of demulsifier is >95%.
4) For synthesis of demulsifier moderate process conditions are required [60-80° C.] and atmosphere pressure] and reactor setup required for synthesis of demulsifier is very simple.
5) The demulsifier is reported to work efficiently at low temperature ranging from 35-40° C. with the dosage ranging from 20 to 5000 ppm depending upon the characteristics of crude oil and demulsification conditions.
6) The curing time required for demulsification of crude is very low ranging from 3 min to 6 min.
7) The demulsifier is reported to be lipophilic i.e. soluble in oil and insoluble in water as styrene increases oil solubility. The HLB Number of the polymer is found to be less than 20. This will be beneficial to the industry as it will not create the problem to the effluent treatment.
8) Present invention provides a low temperature process for demulsification of crude oil using novel demulsifiers as described above, dose in the range of 20-5000 ppm, in 1-10 minutes to obtain a) Crude oil with <1% water; and
b) Water <100 ppm oil,

The invention claimed is:

1. A process for demulsification of crude oil, said process comprising treating crude oil with a copolymer solution in the range of 20-1000 ppm of crude oil emulsion, in the temperature range of 25-40° C. to obtain demulsified crude oil having oil with <1% water, and Water <100 ppm oil;
   wherein the co-polymer solution comprises a co-polymer of styrene and sodium acrylate, styrene and sodium fumarate, or styrene and 4-vinyl pyridine in a non-polar solvent.

2. The process as claimed in claim 1, wherein the copolymer has a molecular weight in the range of 10000 to 600000 Daltons.

3. The process as claimed in claim 1, wherein demulsifying is done in 1-10 minutes.

4. The process as claimed in claim 1, wherein the efficiency of the demulsification process as measured by the amount of water removed from the crude oil is >95%.

5. The process according to claim 1, wherein the crude oil is treated for a period of 3 to 6 minutes.

6. The process according to claim 1, wherein the non-polar solvent is selected from the group consisting of toluene, xylene, cyclohexane, benzene, and chloroform.

7. A process for demulsification of crude oil, said process comprising treating crude oil with a copolymer in the range of 40-5000 ppm of crude oil emulsion, in the temperature range of 25-40° C. to obtain demulsified crude oil having oil with <1% water, and Water <100 ppm oil;

wherein the co-polymer is a co-polymer of styrene and sodium acrylate, styrene and sodium fumarate, or styrene and 4-vinyl pyridine.

\* \* \* \* \*